Nov. 27, 1934.  M. MENNESSON  1,982,528
APPARATUS FOR MEASURING DISTANCE
Filed Jan. 25, 1929  2 Sheets-Sheet 2
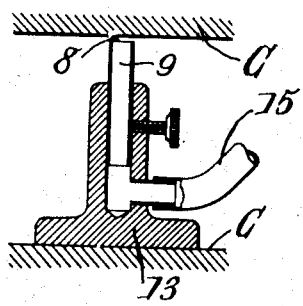
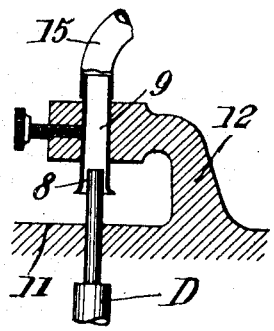
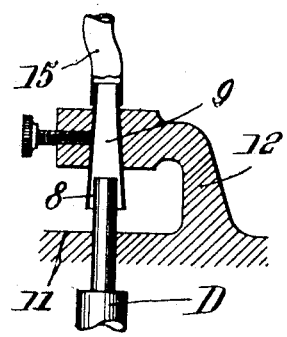
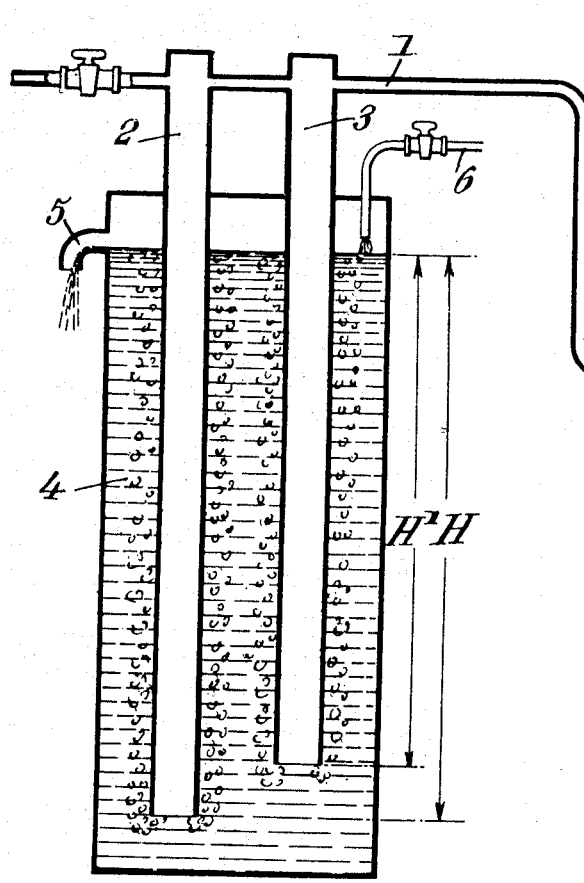
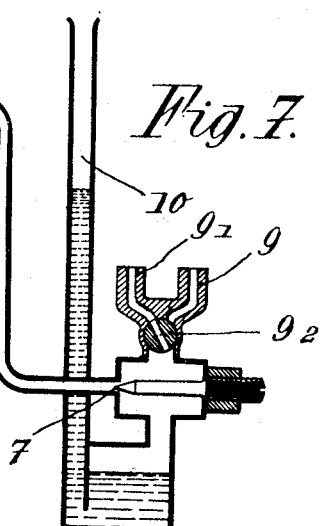
Inventor:
Marcel Mennesson,
Att'y.

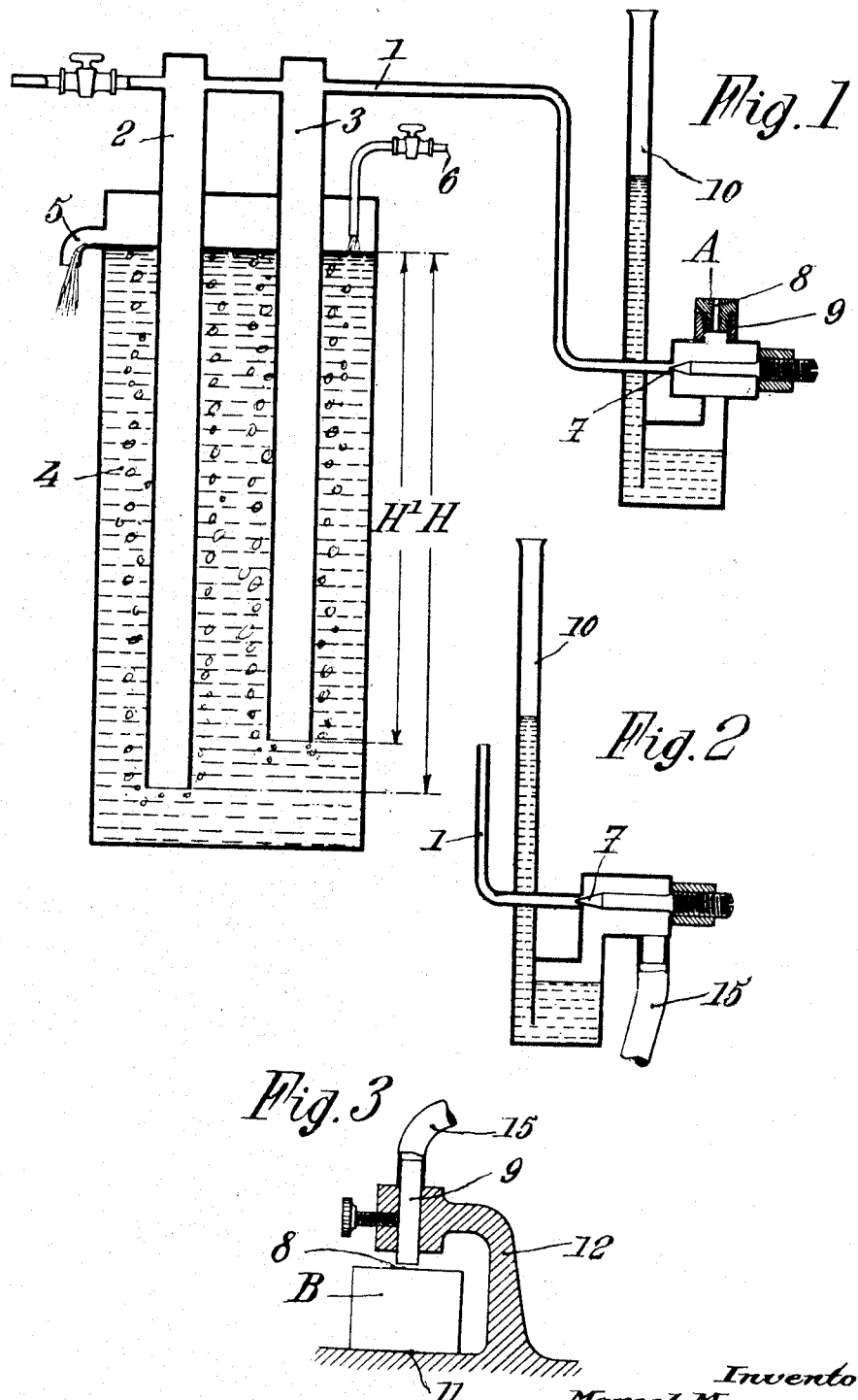

Patented Nov. 27, 1934

1,982,528

UNITED STATES PATENT OFFICE 1,982,528

APPARATUS FOR MEASURING DISTANCE

Marcel Mennesson, Neuilly-sur-Seine, France, assignor to Société Anonyme de Construction de Matériel Automobile S. A. C. M. A., Raynonard, Paris, France Application January 25, 1929, Serial No. 334,987
In Belgium November 24, 1928

17 Claims. (Cl. 33—125)

The present invention relates to methods and apparatus for measuring length and, more particularly, to methods and apparatus for calibrating orifices or for measuring the distance between a pair of surfaces.

One of the objects of the invention is to provide a method and means for measuring the diameter of an orifice or the thickness of an object to an accuracy of approximately 1/1000 of a millimeter without the use of calipers or similar instruments.

Another object is to provide a method and means for rapidly and accurately calibrating orifices such as carburetor nozzles and the like so as to measure the exact amount of fluid which passes therethrough under operating conditions.

Further objects will appear in the course of the detailed description now to be given in connection with the accompanying drawings, in which:—

Fig. 1 is a diagrammatic section through one illustrative embodiment of the invention;

Fig. 2 is a detail of a form of manometer adapted to be used with the devices represented in Figs. 3 to 6;

Fig. 3 shows a form of device adapted for use in measuring the thickness of an object;

Fig. 4 represents the form of device illustrated in Fig. 3 applied to the measurement of the internal diameter of a cylinder;

Fig. 5 illustrates the procedure employed for measuring the diameter of a solid shaft;

Fig. 6 is a modified form of structure for measuring shaft diameters.

Fig. 7 shows a modified form of the structure represented in Fig. 1.

The principle upon which the invention is based is the following:— If a gas under constant pressure is forced through a pair of orifices in series with one another, the gaseous pressure in the space between said orifices will be a function of the relative sections of the latter and the measurement of said gaseous pressure by means of a manometer or the like will indicate the diameter (or section) of one orifice relatively to the other.

Referring to Fig. 1 of the drawings there is shown a measuring assembly consisting of a constant pressure gas supply conduit 1 from which excess of air or the like escapes via one or a pair of vertical tubes 2, 3 extending into a liquid 4 (water or the like) through distances H and H¹ respectively, an overflow 5, a liquid supply conduit 6, a needle valve 7 controlling 1, a nipple 9, and a manometer 10 measuring the pressure in the chamber between valve 7 and nipple 9.

The function of elements 1 to 6 inclusive is essentially to assure a supply of air under constant pressure. In the form of assembly described, the pressure in tube 1 is a function of the difference in level between liquid 4 and the free extremities of tubes 2, 3, the latter acting as safety valves to release momentary excess supply of air. In actual practice it is found that by submerging tubes 2 and 3 to slightly different depths H and H¹, a more accurate regulation of the air pressure in conduit 1 is obtained. As the gas under pressure passes along the tube 1, its pressure drops gradually on account of the friction of the tube. The tubes 2 and 3 are arranged at depths varying in accordance with the variation in pressure between the points where they join the tube 1. This difference in depth has been somewhat exaggerated in the drawings to bring it out more clearly. In this way, by the use of two or more tubes, a more exact control over the pressure is obtained.

The procedure for measuring the section of an orifice is the following:—A standardizing plug A having an orifice 8 therein of known section is first mounted on nipple 9 and valve 7 is adjusted so that manometer 10 gives any reading desired. Plug A is then removed and replaced by a plug having an orifice therethrough of unknown section. A reading of manometer 10 then indicates in terms of pressure the difference in section between orifice 8 in plug A and in orifice through the plug being measured.

From the above it will be seen that the section of any orifice may be quickly and accurately measured without recourse to calipers or similar instruments and without passing liquids subject to changes in viscosity therethrough.

It is obvious that plug A and those to be measured need not necessarily screw onto nozzle 9 but may coact therewith by means of properly formed plane or conical machined surfaces, or by compressive contact with rubber, fiber, or other plastic material adapted to seal the joint between these two elements. If desired, the articles to be measured may be carried to and past nipple 9 by any convenient type of automatic carriage, the blast of air from the nozzle serving to clean the orifice to be measured and the surface engaging with the measuring device.

In the form of device shown in Fig. 3, nozzle 9 is made in the form of a cylindrical tube and is supported over an article B, whose thickness is to be measured, by a supporting arm 12 mounted on a table 11. Manometer 10, connected to nipple 9 by flexible hose 15, will measure the thickness of the annular space 8 between block B and the end of the nipple and indicate variations in thickness of any series of blocks relatively to block B taken as a standard.

Fig. 4 shows nipple 9 supported on a machined base 13, the whole assembly being inserted into cylinder C so as to leave an annular space 8 whose "thickness", measured by manometer 10 (via tube 15), and added to the overall length of assembly 9, 13 gives an accurate measure of the cylinders' diameter.

Fig. 5 shows the manner in which the invention is applied to the measurement of the diameter of a shaft. Here, nipple 9 fits over the end of shaft D, and the manometer registers the section of the space between the nipple and the shaft. The inside diameter of the nipple being known, the manometer readings may be arranged to register direct by the section or diameter of the shaft inserted into the former.

In the form of device represented in Fig. 6, nipple 9 is given a conical section, and support 11, 12 is arranged to be displaced vertically over the end of shaft D. By providing a suitable scale (not shown), the distance that cone 9 must be moved over shaft D to register any chosen reading of manometer 10 may be taken as an indication of the diameter of the shaft.

The structure shown in Fig. 7 differs from the one represented in Fig. 1 only in providing an extra nipple 9¹ controlled by a valve 9² whereby a standardizing plug corresponding to the plug A of Fig. 1 may be mounted permanently and compared by a plug to be measured by the shifting of valve 9².

It will be noted that the surface of the liquid in the tank 4, the nipple 9, and the indicating tube 10 of the manometer are all open to the atmosphere so that changes in pressure in the air will be reflected in all of the measuring elements.

What I claim is:—

1. In a work measuring apparatus comprising a pressure chamber having an orifice therein open to the atmosphere and a second restricted orifice a source of gaseous pressure, means for measuring the pressure in said chamber and means connecting said second orifice to said source of gaseous pressure, that improvement which consists of means intercalated in said connecting means between said second orifice and said source of gaseous pressure for preserving a constant pressure in said connecting means, said last named means comprising a tank open to the atmosphere and adapted to contain a liquid, and a tube communicating with said connecting means in front of said second orifice and extending below the level of the liquid in said tank.

2. In a measuring apparatus comprising a pressure chamber having an orifice therein open to the atmosphere and a second orifice, a source of gaseous pressure, means for measuring the pressure in said chamber and means connecting said second orifice to said source of gaseous pressure, that improvement which consists of means intercalated in said connecting means between said second orifice and said source of gaseous pressure for preserving a constant pressure in said connecting means, said last named means comprising a tank open to the atmosphere and adapted to contain a liquid, and a plurality of tubes communicating with said connecting means at different points and extending to different depths below the level of the liquid in said tank.

3. A work measuring apparatus comprising a chamber having an orifice therein communicating with the atmosphere, the amount of flow through said orifice determining the dimension to be measured, a manometer connected to said chamber to measure the pressure therein and having one end open to the atmosphere, said chamber having a second restricted orifice therein, a source of gaseous pressure connected to said second orifice, a tank adapted to contain a liquid and open to the atmosphere, a tube intercalated between said source of gaseous pressure and said second orifice and extending below the level of the liquid in said tank, whereby gas is supplied to said chamber at a constant pressure.

4. In a work measuring device of the class described, a source of fluid under pressure, means to permit any excess of fluid above that required for a given pressure to escape into the atmosphere, means to conduct said fluid in a confined path to a point adjacent the work and to direct the fluid in an unconfined jet against the work, means in said conducting means to regulate the flow of fluid therethrough, said last means including means to permit any excess of fluid above that required for a given pressure to escape into the atmosphere before it reaches said directing means, so that pressure fluid may issue from said directing means through the space between said directing means and the work, means connected to said conducting means to indicate the pressure therein, variation in the velocity with which the fluid issues from the directing means being indicated by changes in the indication of said indicating means whereby variation in the distance between said directing means and the work will be indicated.

5. In a work measuring device of the class described, a fluid pressure system including a chamber having two orifices, a source of fluid under pressure, means connecting said source of fluid to one of said orifices, means interposed in said connecting means to regulate the flow of fluid therethrough, said last named means comprising means to permit any excess of fluid above that required for a given pressure to escape into the atmosphere before it reaches said pressure chamber, a pressure gauge connected to said chamber, a nozzle connected to the other orifice, said nozzle being adapted to be positioned adjacent the surface of the work so that pressure fluid may issue therefrom between the end of the nozzle and the surface of the work, variation in the velocity with which the fluid issues through the nozzle being indicated by changes in the indication of said gauge whereby variation in the distance between the end of the nozzle and the surface of the work will be indicated.

6. In a work measuring device of the class described the combination of a fluid pressure system including a nozzle, means in said fluid pressure system to regulate the flow of fluid therethrough, said last means comprising means to permit any excess of fluid above that required for a given pressure to escape into the atmosphere before it reaches said nozzle, said nozzle being adapted to be positioned adjacent the surface of the work so that pressure fluid may issue therefrom through the space between the end of the nozzle and the surface of the work, means connected to said fluid pressure system to indicate the pressure therein, variation in the velocity with which the fluid issues through the nozzle being indicated by changes in the indication of said indicating means whereby variation in the distance between the end of the nozzle and the surface of the work will be indicated.

7. In a work measuring device of the class described the combination of a fluid pressure system including a nozzle, said nozzle being adapted to be positioned adjacent the surface of the work so that pressure fluid may issue therefrom through the space between the end of the nozzle and the surface of the work, means to regulate automatically the pressure in said fluid pressure system, said last named means comprising means to permit any excess of fluid above that required for a given pressure to escape into the atmosphere, a gauge, means whereby said gauge may be connected to said fluid pressure system, variation in the velocity with which the fluid issues through the nozzle being indicated by changes in the indication of said gauge whereby variation in the distance between the end of the nozzle and the surface of the work will be indicated.

8. In a work measuring device of the class described, a fluid pressure system including a chamber having two orifices, a source of fluid under pressure, means connecting said source of fluid to one of said orifices, means interposed in said connecting means to regulate the flow of fluid therethrough, said last named means comprising means to permit any excess of fluid above that required for a given pressure to escape into the atmosphere before it reaches said pressure chamber, a nozzle connected to the other orifice, a gauge, means whereby said gauge may be connected to said fluid pressure system, variation in the velocity with which the fluid issues through the nozzle being indicated by changes in the indication of said gauge whereby variation between a nozzle of known size and a nozzle of unknown size will be indicated.

9. In a work measuring device of the class described, a fluid pressure system including a chamber having two orifices, a source of fluid under pressure, means connecting said source of fluid to one of said orifices, means interposed in said connecting means to regulate the flow of fluid therethrough, said last named means comprising a tank open to the atmosphere and adapted to contain a liquid, and a tube communicating with said connecting means at a point in front of said first orifice and extending below the level of the liquid in said tank, a pressure gauge connected to said chamber, a nozzle connected to the other orifice, said nozzle being adapted to be positioned adjacent the surface of the work so that pressure fluid may issue therefrom between the end of the nozzle and the surface of the work, variation in the velocity with which the fluid issues through the nozzle being indicated by changes in the indication of said gauge whereby variation in the distance between the end of the nozzle and the surface of the work will be indicated.

10. In a work measuring device of the class described, the combination of a fluid pressure system including a source of fluid under pressure, a nozzle, and means connecting said source and nozzle, said nozzle being adapted to be positioned adjacent the surface of the work so that pressure fluid may issue therefrom through the space between the end of the nozzle and the surface of the work, means to regulate automatically the pressure in said fluid pressure system, said last named means comprising a tank open to the atmosphere and adapted to contain a liquid, and a tube communicating with said connecting means and extending below the level of the liquid in said tank, a gauge, means whereby said gauge may be connected to said fluid pressure system, variation in the velocity with which the fluid issues through the nozzle being indicated by changes in the indication of said gauge whereby variation in the distance between the end of the nozzle and the surface of the work will be indicated.

11. In a work measuring device of the class described, a fluid pressure system including a chamber having two orifices, a source of fluid under pressure, means connecting said source of fluid to one of said orifices, means interposed in said connecting means to regulate the flow of fluid therethrough, said last named means comprising a tank open to the atmosphere and adapted to contain a liquid, and a tube communicating with said connecting means at a point in front of said first orifice and extending below the level of the liquid in said tank, a gauge, means whereby said gauge may be connected to said fluid pressure system, a nozzle connected to the other orifice, variation in the velocity with which the fluid issues through the nozzle being indicated by changes in the indication of said gauge whereby variation between a nozzle of known size and a nozzle of unknown size will be indicated.

12. In a work measuring apparatus comprising a pressure chamber having an orifice therein open to the atmosphere and a second restricted orifice, a source of gaseous pressure, means for measuring the pressure in said chamber and means connecting said second orifice to said source of gaseous pressure, that improvement which consists of means intercalated in said connecting means between said second orifice and said source of gaseous pressure for preserving a constant pressure in said connecting means, said last named means comprising means to permit any excess fluid above that required for a given pressure to escape into the atmosphere before it reaches said pressure chamber.

13. In a work measuring device of the class described, a fluid pressure system including a chamber having two orifices, a source of fluid under pressure, means connecting said source of fluid to one of said orifices, means interposed in said connecting means to regulate the flow of fluid therethrough, said last named means comprising means to permit any excess of fluid above that required for a given pressure to escape into the atmosphere before it reaches said pressure chamber, a pressure gauge connected to said chamber, a nozzle adapted to be positioned adjacent the surface of the work so that the pressure fluid may issue therefrom between the end of the nozzle and the surface of the work, a flexible conduit connecting the other orifice of said chamber to said nozzle, variation in the velocity with which the fluid issues through the nozzle being indicated by changes in the indication of said gauge, whereby variation in the distance between the end of the nozzle and the surface of the work will be indicated.

14. In a dimension measuring device, a support, a nozzle mounted on said support, the distance between the nozzle and the surface of an object to be measured varying according to variations in the desired dimension of the object, a fluid pressure system including a chamber having two orifices, a source of fluid under pressure connected to one of said orifices, means in said connecting means to regulate the flow of fluid therethrough, said last means comprising means to permit any excess of fluid above that required for a given pressure to escape into the atmosphere before it reaches said chamber, a flexible conduit connecting said nozzle to the other of said orifices, whereby fluid under pressure may escape between said nozzle and said surface with a velocity varying with the distance therebetween, and pressure indicating means connected to said chamber for determining variations in said dimension.

15. In a work measuring device of the class described, a fluid pressure system including a chamber having two orifices, a source of fluid under pressure, means connecting said source of fluid to one of said orifices, means interposed at said connecting means to regulate the flow of fluid therethrough, said last named means comprising means to permit any excess of fluid above that required for a given pressure to escape into the atmosphere before it reaches said pressure chamber, a conical nipple, a flexible conduit connecting the other orifice of said chamber to said nipple, means for supporting said nipple, said nipple being positioned so as to surround the extremity of the work, so that pressure fluid may issue therefrom between the inner wall of the nipple and the outer wall of the work, variation in the velocity with which fluid issues through such nipple being indicated by changes in indication of said gauge, whereby variation in the distance between the inner wall of the nipple and the outer wall of the work will be indicated.

16. In a work measuring device of the class described, a fluid pressure system including a chamber having two orifices, a source of fluid under pressure, means connecting said source of fluid to one of said orifices, means interposed in said connecting means to regulate the flow of fluid therethrough, said last named means comprising means to permit any excess of fluid above that required for a given pressure to escape into the atmosphere before it reaches said pressure chamber, a nipple, a flexible conduit connecting the other orifice of said chamber to said nipple, means for supporting said nipple, said nipple being positioned so as to surround the extremity of the work, so that pressure fluid may issue therefrom between the inner wall of the nipple and the outer wall of the work, variation in the velocity with which fluid issues through such nipple being indicated by changes in the indication of said gauge, whereby variation in the distance between the inner wall of the nipple and the outer wall of the work will be indicated.

17. In a dimension measuring device, a support adapted to be slidably positioned on an internal surface of a hollow piece, a nozzle adjustably mounted on said support and adapted to be positioned in adjusted position adjacent the opposite surface of the hollow piece to be measured, the distance between the nozzle and said opposite surface varying according to variation in the dimension of said hollow piece, a fluid pressure system including means to permit any excess of fluid above that required for a given pressure to escape into the atmosphere, a chamber having two orifices, means connecting said fluid pressure system to one of said orifices, a flexible conduit connecting said nozzle to the other of said orifices, whereby fluid under pressure may escape between said nozzle and said surface with a velocity varying with the distance therebetween, and pressure indicating means connected to said chamber for determining variations in said dimension.

MARCEL MENNESSON.